United States Patent
Curzi et al.

(10) Patent No.: US 10,997,408 B2
(45) Date of Patent: May 4, 2021

(54) ESTIMATING DOCUMENT READING TIME BASED ON APPARENT USER READING ACTIVITY

(71) Applicant: MICROSOFT TECHNOLOGY LICENSING, LLC, Redmond, WA (US)

(72) Inventors: Alessandro Curzi, Dublin (IE); Nicole Michel, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 52 days.

(21) Appl. No.: 16/171,931

(22) Filed: Oct. 26, 2018

(65) Prior Publication Data

US 2020/0097716 A1 Mar. 26, 2020

Related U.S. Application Data

(60) Provisional application No. 62/734,747, filed on Sep. 21, 2018.

(51) Int. Cl.
*G06F 3/0483* (2013.01)
*G06K 9/00* (2006.01)
(Continued)

(52) U.S. Cl.
CPC ....... *G06K 9/00469* (2013.01); *G06F 3/0483* (2013.01); *G06F 17/18* (2013.01); *H04L 67/146* (2013.01); *H04L 67/22* (2013.01)

(58) Field of Classification Search
CPC .............................. G06F 3/0483; H04L 67/22
See application file for complete search history.

(56) References Cited

U.S. PATENT DOCUMENTS 6,708,173 B1 * 3/2004 Behr ................... G06F 11/3636
10,366,405 B2 * 7/2019 Wigder ................ G06F 3/0483
(Continued)

FOREIGN PATENT DOCUMENTS

EP 2930592 A1 10/2015

OTHER PUBLICATIONS

Hlavac et al., "Detecting Genuinely Read Parts of Web Documents," copyright 2017 IEEE, p. 6-11. (Year: 2017).*
(Continued)

*Primary Examiner* — Amelia L Tapp
(74) *Attorney, Agent, or Firm* — Newport IP, LLC; Jacob P. Rohwer

(57) ABSTRACT

Methods, systems, and media are shown for calculating an estimated amount of time needed to read a document. The estimate is based on historical session data. Reading sessions are identified in part by excluding sessions that include non-reading user behavior signals, such as adding text to the document, printing, or changing formatting. Reading sessions are further identified by generating session clusters based on shared attributes, and for each cluster, determining if a relationship exists between session time and the shared attribute. If a relationship exists, sessions are excluded if they don't fit the relationship.
Once reading sessions are identified, coefficients for a formula are generated that are applied to an unseen document to estimate reading time. Each coefficient is associated with an element type. The coefficients are derived by iteratively analyzing documents with one unknown element type and subtracting out contributions of known element types.

20 Claims, 10 Drawing Sheets

(51) Int. Cl.
 *G06F 17/18* (2006.01)
 *H04L 29/08* (2006.01)

(56) References Cited

U.S. PATENT DOCUMENTS

| | | | | |
|---|---|---|---|---|
| 2003/0210226 A1* | 11/2003 | Ho | | G06F 3/0483 345/156 |
| 2010/0257457 A1* | 10/2010 | De Goes | | H04L 65/1093 715/751 |
| 2013/0015954 A1* | 1/2013 | Thorne | | G06F 3/04883 340/8.1 |
| 2013/0238619 A1* | 9/2013 | Hanaoka | | G06F 16/245 707/736 |
| 2014/0164593 A1* | 6/2014 | Murray | | G06Q 30/02 709/224 |
| 2014/0237344 A1* | 8/2014 | Murata | | G06F 40/169 715/230 |
| 2014/0315163 A1* | 10/2014 | Ingrassia, Jr. | | G09B 17/003 434/169 |
| 2015/0121217 A1* | 4/2015 | O'Donoghue | | G06Q 30/0185 715/708 |
| 2016/0154551 A1* | 6/2016 | Heo | | G06F 3/0483 715/776 |
| 2017/0323205 A1 | 11/2017 | Gonzalez et al. | | |
| 2018/0323985 A1* | 11/2018 | Safa | | G06F 21/6209 |

OTHER PUBLICATIONS

"International Search Report and Written Opinion Issued in PCT Application No. PCT/US19/039113", dated Sep. 10, 2019, 12 Pages.

* cited by examiner

ESTIMATING DOCUMENT READING TIME BASED ON APPARENT USER READING ACTIVITY

CROSS-REFERENCE TO RELATED APPLICATIONS

This application claims priority under 35 U.S.C. § 119(e) to U.S. Provisional Patent Application No. 62/734,747, filed on Sep. 21, 2018, the disclosure of which is expressly incorporated by reference herein in its entirety.

BACKGROUND

It has been challenging to estimate how much time someone will take to read a document. People have limited amounts of time, and so knowing how long it will take helps them prioritize tasks and schedule their day. Knowing how long it takes to read a document also helps document creators tailor their content to time-sensitive audiences. For example, if research shows that readers stop paying attention after 5 minutes, document creators may edit their content accordingly to maximize viewership.

Estimated reading time may be calculated based on historical data captured as many users read many different documents. However, it is difficult to know when a document opened in an application was actually being read and not just left open while the user gets a coffee.

Estimating reading time for a document is further complicated when the document includes types of content other than text, such as images, tables, figures, etc., as each different type of content contributes differently to the estimate. It is with respect to these and other technical challenges that the disclosure made herein is presented.

BRIEF DESCRIPTION OF THE DRAWINGS

FIG. 4B illustrates a first half of a list of user actions captured in historical data;

FIG. 4C illustrates a second half of a list of user actions captured in historical data;

DETAILED DESCRIPTION

Figure 1:
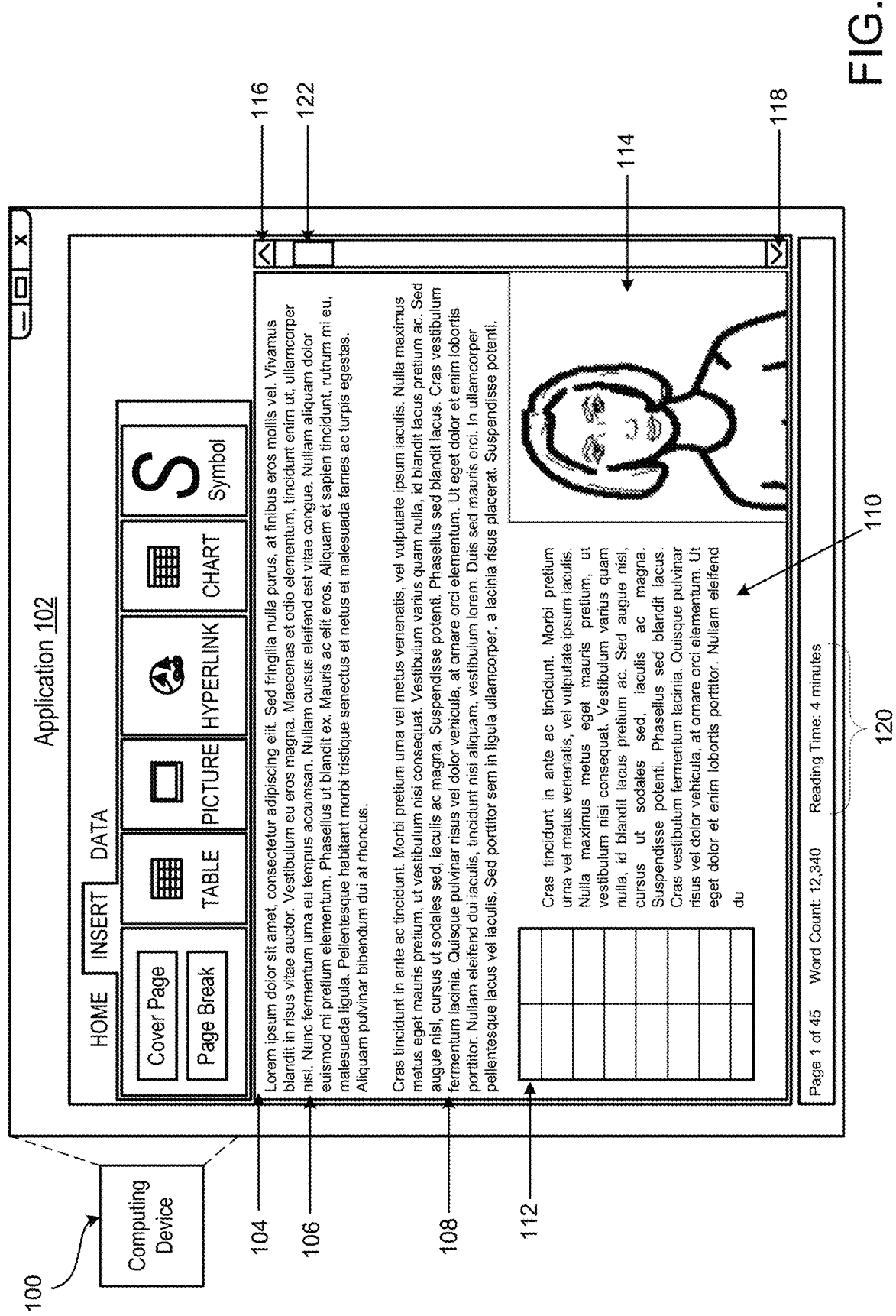
FIG. 1 illustrates a complex document loaded into an application that displays and estimated reading time.

Embodiments calculate an estimated amount of time needed to read a document. The estimate may aggregate estimates for different types of content that are embedded in a document. For example, there are 45 types of content currently embeddable in a Microsoft® Word document, each of which may contribute to an estimated reading time.

The estimate is based on historical session data, where a session is a span of time when a particular document was open in an application during which user behavior signals are recorded. For instance, a session may begin when a document is opened (e.g. first rendered in the application), and end when the document is closed. Reading sessions—sessions in which the user was exclusively or primarily reading the document—are identified by applying a series of conditions and rules to filter out editing, printing, commenting, and other non-reading sessions, and then applying conditions and rules to positively identify reading sessions. By filtering out non-reading sessions, inferences about reading time can be based on data derived from a user actually reading a document. This improves the accuracy of the estimation.

Some sessions are filtered out because they include user behavior signals associated with a non-reading task. For example, directly entering text into a spreadsheet or a command to paste text into a word processing document indicates that the user was editing the document, not just reading it. Other tasks, such as printing the document, commenting on the document, etc., may similarly be identified based on user behavior signals, and removed accordingly.

Then, user actions may be analyzed to identify sessions with a high confidence score of being reading sessions. For example, sessions that contain enough scroll actions to have displayed the document are assigned a higher confidence than sessions that could not have been scrolled through completely. A deeper analysis may analyze when the user actions took place, such as inferring a scroll speed from a time series of events. Sessions that contain a consistent scroll rate compatible with reading a document will be assigned a higher confidence of being a reading session than a session that has inconsistent or very high scroll rates.

The remaining sessions are ranked based on an inner- and inter-cluster analyses as described below. Sessions or clusters that score poorly, e.g. by falling below a defined cut-off in the ranking are removed from consideration, such that there is high confidence that the remaining sessions or clusters represent actual reading sessions. These remaining sessions may then be analyzed to generate an algorithm for estimating reading time, as described further below.

A cluster is a collection of sessions that have a shared attribute, such as document ID, user ID, number of times a scroll command was received, whether or not the document includes a table, etc. In some embodiments, a cluster of sessions is determined by applying a criteria to a table of data, such as a wherein clause or a group-by clause. For example, a cluster may include all sessions generated by a particular user by filtering based on a user ID attribute. Clusters may also be defined, for example, based on whether an attribute is within a defined range of values, e.g. if a document is between 5 and 10 pages long.

For sessions within a cluster, session length (i.e. how long was the document open) is plotted against the shared attribute (e.g. the number of times a scroll command was received per time unit), and a regression is performed to detect a correlation between the two. If there is a correlation between session length and the shared attribute—i.e. the regression could fit a line to the plot—then it is determined that the shared attribute can be used to determine if the session was a reading session. Specifically, a session is ranked higher in the ordering (i.e. more likely to be a reading session) if the shared attribute is close to the regression line. Similarly, sessions having a shared attribute that is beyond a defined distance from the regression line are considered non-reading sessions, and removed.

In some embodiments, a baseline regression line may be imported from another source. For example, a baseline regression line may be imported from research on human subjects that has measured reading time in a controlled environment. Analysis based on an imported regression line may proceed as discussed above, i.e. removing sessions beyond a defined distance from the imported regression line.

In some embodiments, three or more dimensions may be analyzed. For example, in addition to a Y-axis indicating session length and an X-axis indicating a number of words, an additional Z-axis including a number of images may be plotted. Similar to two dimensional scenarios, a regression line may be fit and outlying sessions (sessions beyond a defined distance from the regression line) may be removed from further consideration as unlikely to be actual reading sessions.

In some embodiments, clusters can themselves be ranked. Based on this ranking, sessions from higher ranking clusters may be given more weight when identifying reading sessions, while sessions from lower ranking clusters may be given less weight or removed from consideration entirely. In some embodiments, the clusters that are compared share an attribute, such as a document ID. In this example, each cluster is associated with a particular document, and so the ranking identifies which documents provide greater insight into whether a session is a reading session. The clusters may be ranked based on an average distance of each point from the regression line—i.e. how well does the regression line fit the cluster. Clusters with a better fit may be ranked higher. By applying this inter-cluster ranking, clusters that perform poorly, e.g. by falling below a given cut-off score, are removed entirely, i.e. all the sessions belonging to those clusters are removed, regardless of how close an individual session is to its cluster's regression line. In some embodiments all the sessions belonging to those clusters are removed even if they appear in another cluster and would not be removed based on the analysis of the other cluster.

Inter-cluster ranking may also be used to promote session rankings if a particular cluster that includes a session is deemed reliable. For example, for clusters based on user IDs (i.e. sessions associated with the same user), if a particular user has significantly more data points than average, that user may be deemed a frequent reader, and as such more reliable. Sessions from that user may be ranked higher, and sessions generated by that user may be given more weight when fitting regressions when clustering on another attribute.

Once reading sessions have been identified, they are used to generate coefficients for an algorithm that estimates reading time for an unseen document (i.e. a document that wasn't part of an already identified reading session). Each coefficient may be associated with a different element type, such as text, image, table, header, etc. Coefficients may also be generated for terms that represent the language the document is written in, information particular to the user of the application, or other factors that impact reading time. Coefficients are calculated for a first element type by analyzing sessions from documents that only have that element type. Coefficients for subsequent element types are calculated by analyzing sessions from documents that include only the new element type and previously analyzed element types. Put differently, coefficients are calculated one-by-one, based in part by subtracting out the contributions of previously analyzed element types.

For example, a reading time associated with text is estimated by analyzing sessions having text-only documents. Then, a reading time for images is determined by analyzing session time for documents that contain text and images. The contribution to reading time for images is found by subtracting out the reading time associated with text.

Once a coefficient for each element type has been calculated, the algorithm may be applied to unseen documents. For example, an unseen document may be opened and parsed to determine a number of words, paragraphs, images, pictures, tables, etc., contained therein. Each of these values is multiplied by the corresponding coefficient, and the results are added together to produce the total reading time estimate.

It should be appreciated that the above-described subject matter can be implemented as a computer-controlled apparatus, a computer-implemented method, a computing device, or as an article of manufacture such as a computer readable medium.

The improved understanding of estimated document reading time can yield significant benefits to content creators and content consumers. Content consumers benefit by the ability to plan their day, to seek out content commensurate with the time they have available, to avoid overly long or short pieces of content, etc. Content creators benefit by knowing how long their document will take to read, enabling them to target a particular audience, and enabling them to edit their document to meet a particular reading time goal.

The claims recited below are not directed to an abstract idea, and are not comparable to concepts previously identified by the courts as abstract. For example, no court has previously identified estimating reading time as an abstract concept. Furthermore, meaningful limitations recited in the claims below go beyond generally linking the use of any alleged abstract idea to a particular technological environment. For example, creating clusters of sessions based on a shared attribute, and for each cluster identifying whether a regression can be made to fit a relationship between session time and the shared attribute, clearly constitutes "significantly more". As such, the claims recited below are subject matter eligible.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable customer electronics, computing or processing systems embedded in devices (such as wearables, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several figures, aspects of estimating document reading time based on historical document reading activity will be described.

FIG. 1 illustrates a computing device 100 displaying a complex document 104 loaded into an application 102 that displays estimated reading time 120. Document 104 includes paragraphs 106, 108, and 110, table 112, and picture 114, each of which may contribute to the estimated reading time. In some embodiments, total estimated reading time is calculated by adding together the reading times estimated for constituent parts of the document.

FIG. 1 also depicts scroll buttons 116 and 118, which are clickable by a user to scroll the document. Scrolling may also be performed by a user clicking and dragging scroll bar 122, by keyboard input, or other means.

In some embodiments, estimated reading time 120 is made available in other contexts. For example, in addition to listing the estimated reading time within the document itself, estimated reading time may be displayed next to otherwise proximate to an icon representing the document, such as in a file explorer, list of email attachments, collaboration software, etc.

Figure 2:
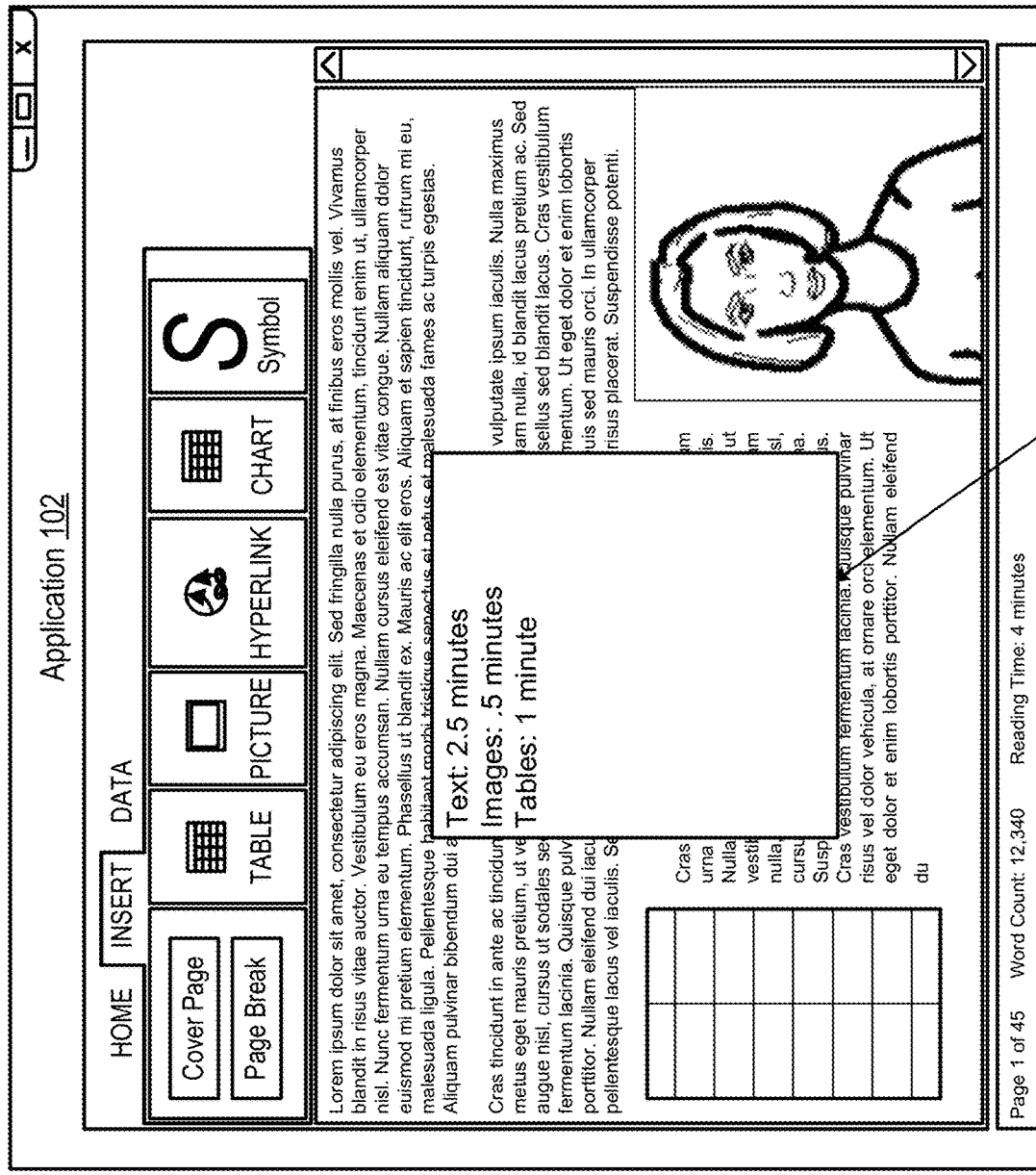
FIG. 2 illustrates a detailed view of estimated reading time based on different element types found within the document.

FIG. 2 illustrates a detailed view 200 of estimated reading time based on different element types found within the document 104. In some embodiments, a user is enabled to click on estimated reading time 120 to display pop-up 202, which lists each element type's contribution to the documents estimated reading time.

Figure 3:
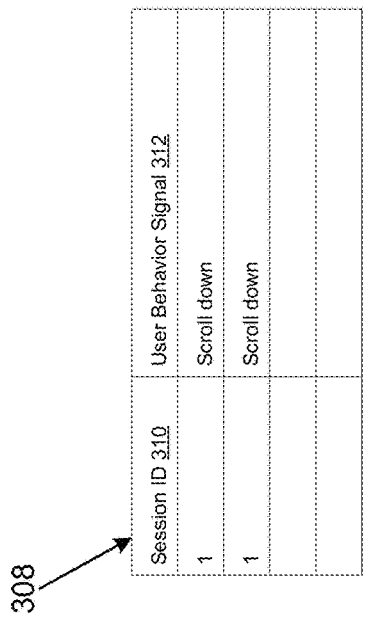
FIG. 3 illustrates excluding sessions that have a user behavior signal consistent with a non-reading action.

FIG. 3 illustrates excluding sessions that have a user behavior signal consistent with a non-reading action. In this example, table 302 represents a list of user behavior signals 306, such as the "scroll down" behavior signal. Each user behavior signal 306 is associated with a corresponding session ID 304, as well as other pieces of data, not illustrated. Each of user behavior signals 306 have been captured based on actions taken by one or more users using the application to open the document.

"Scroll down" behavior signals, as well as the "click down arrow" behavior signal, do not edit the contents of the document, and so are consistent with a reading session. However, the "delete in preparation for pasting" event does alter document content, and so the session with ID '2' will be filtered. This is exhibited by table 308, which includes behavior signals from session ID '1' but not session ID '2', which was excluded as an editing session.

Figure 4:
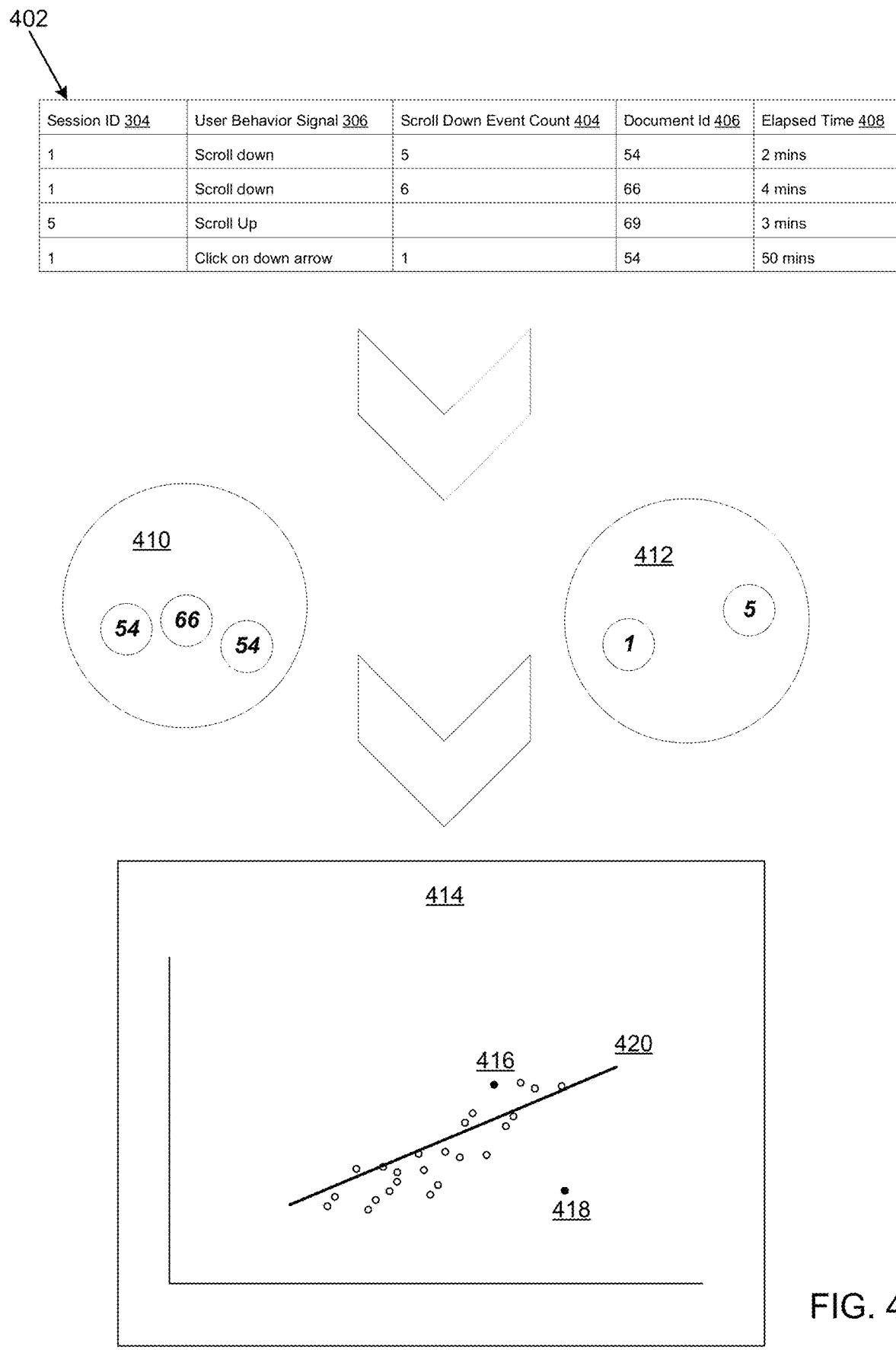
FIG. 4 illustrates clustering sessions, fitting a regression to session length plotted against the shared attribute for each entry in the cluster.

FIG. 4 illustrates clustering sessions, fitting a regression for the plot of session length against the shared attribute, where there is one plot for each entry in the cluster. Table 402 is an extension of table 302, adding columns 404 that indicate how far a scroll action moved the document. Scroll down event count 404 is one attribute that a cluster may be formed on. Column 406 lists the document associated with the user behavior signal, while column 408 indicates how much time expired while the session was active.

Clusters 410 and 412 indicate a collection of sessions that share an attribute. Not all sessions include all attributes, as illustrated by cluster 410 only including sessions associated with document IDs 54 and 66, while cluster 412 includes sessions with scroll event counts less than or equal to 5.

Graph 414 illustrates, for a given cluster, a plot and regression fit of session length (i.e. the amount of time elapsed during the session on the Y-axis and the shared attribute (e.g. 'scroll down event count') on the X-axis. In this example, a regression fit is possible among the data points, and so line 420 is capable of capturing the relationship.

Furthermore, a session that includes data point 416 may be considered close enough to the regression line to be consistent with a reading session, while data point 418 may be considered too far from the regression line, and as such, more likely to be associated with a non-reading session.

Figure 4B:
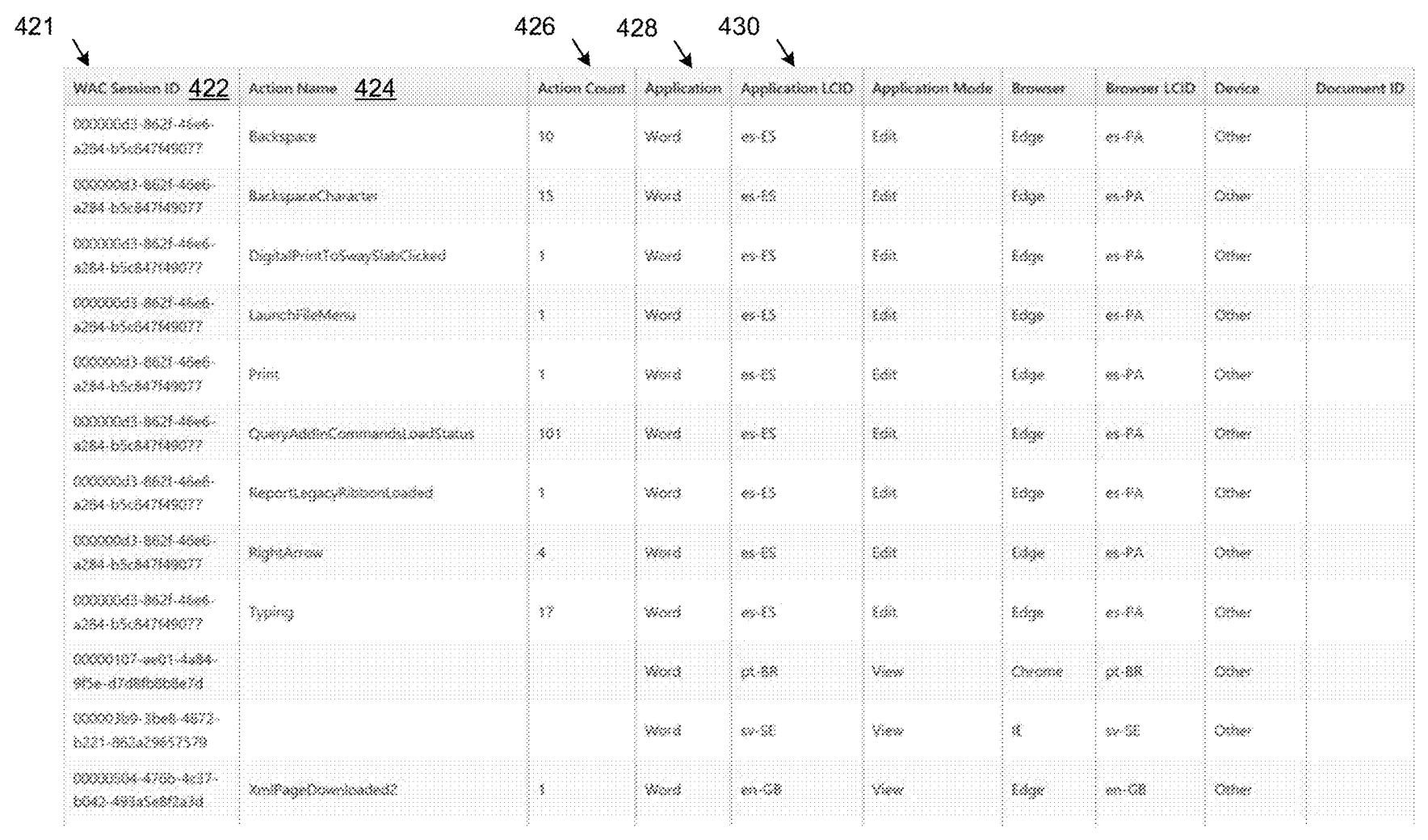

FIG. 4B illustrates a first half of a list of user actions 421 captured in historical data. Specifically, the "WAC Session ID" column 422 indicates a session ID. Note that the first 8 user actions are associated with the same session as they have the same Session ID. The Action Name column 424 names the recorded action, e.g. 'Typing', 'Print', etc. These 'user behavior signals' are used to exclude or promote sessions, as discussed above.

The Action Count column 426 indicates how many times the particular action occurred, the Application column 428 names the application in which the document was loaded, and the Application LCID column 430 indicates the locale (e.g. region) the application was operating in. These and the other columns are the attributes used to generate session clusters.

Figure 4C:
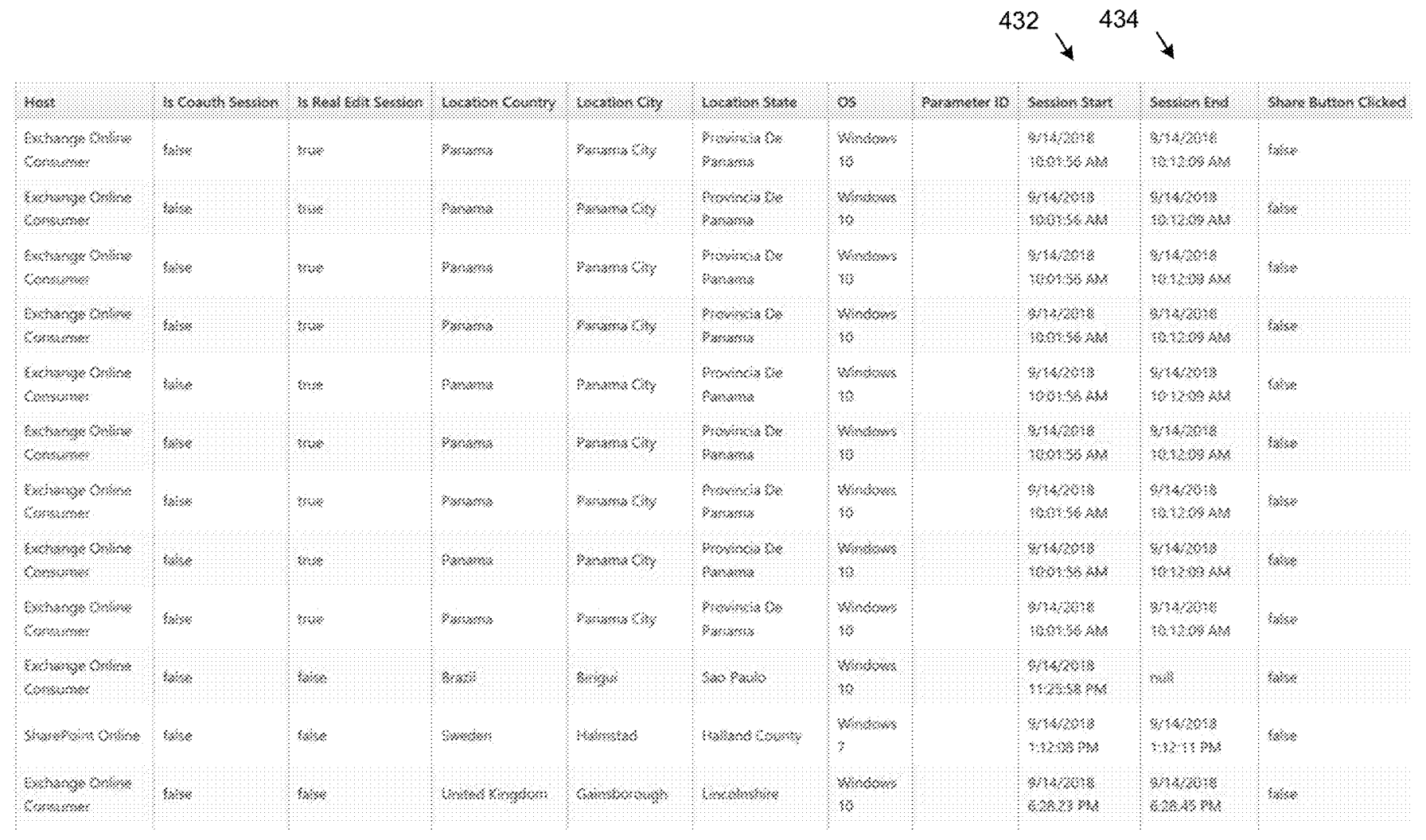

FIG. 4C illustrates a second half of a list of user actions 421 captured in historical data. Included are Session Start 432 and Session End columns 434, which may be used to measure the length of time of a reading session. Other attributes, such as Location City, Location State, etc., may also be used to generate session clusters.

Figure 5:
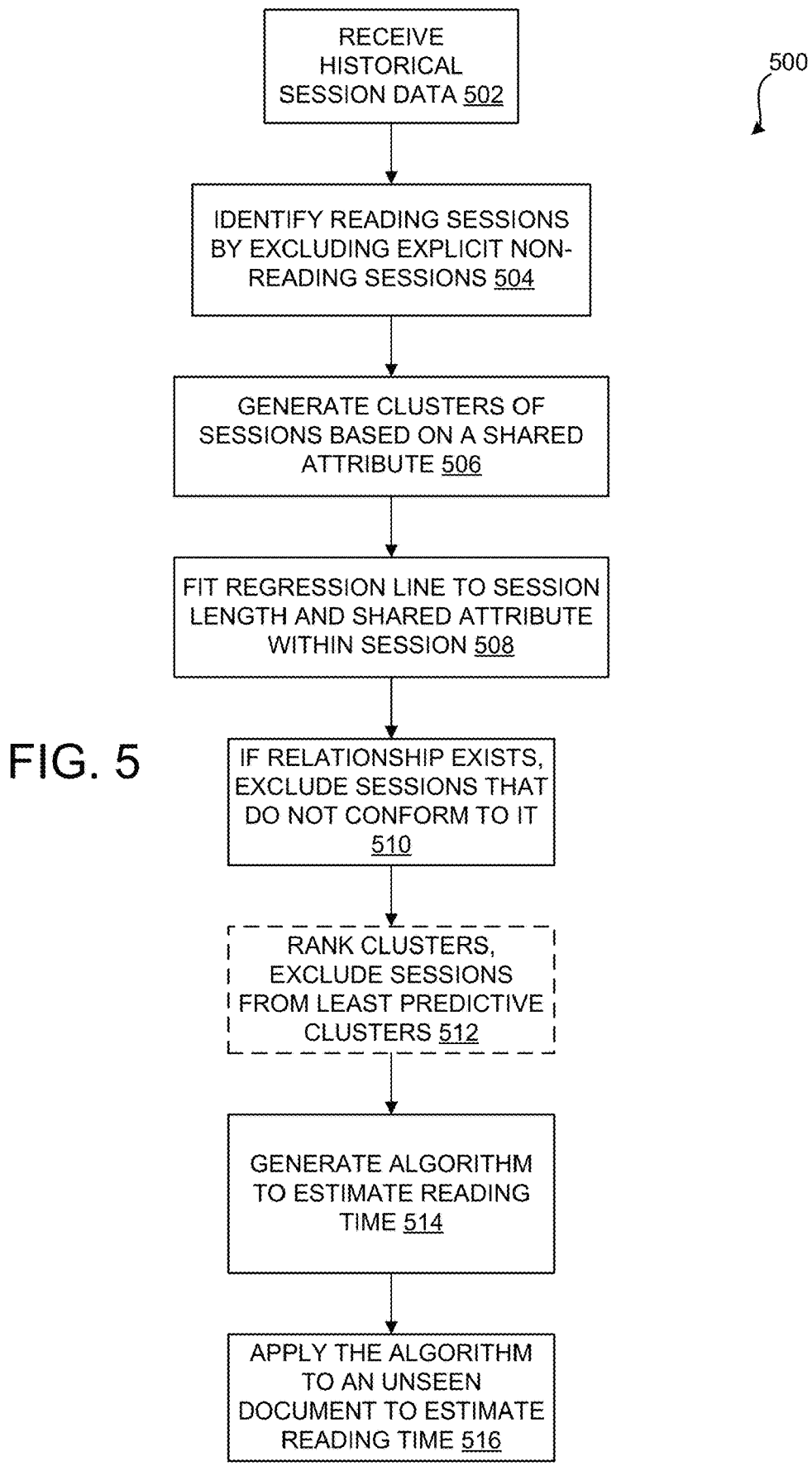
FIG. 5 is a flow diagram that illustrates aspects of a process for estimating reading time in accordance with the disclosed technology.

FIG. 5 is a flow diagram that illustrates aspects of a process 500 for estimating reading time in accordance with the disclosed technology. Process 500 may be implemented, for example, by computing device 100.

Process 500 begins with operation 502, where historical session data is received. Historical session data may include session data captured as users interact with a software application. Historical session data maybe collected in a number of different embodiments. The software application may execute locally on a desktop computer, on a mobile device, or in a cloud computing environment via a web browser, or a combination thereof. Historical session data may be gathered and aggregated directly by a cloud-hosted application. Alternatively, usage data of a desktop or mobile app may be periodically transmitted to a centralized repository.

Session data may include behavior signals captured from human-computer interaction, such as keystrokes, mouse clicks, mouse movements, gestures, touch input, speech input, and the like. Behavior signals may create, edit, or delete content in a document, e.g. alpha-numeric keystrokes that add content to a document, or a backspace keystroke that deletes content. Behavior signals may also include commands, both commands generated by human-computer interaction and commands received from an automation framework, e.g. macros. Commands often trigger a response by the application, such as a scroll command, a print command, or a document save command. Behavior signals may also include inputs that do not affect the state of the application or the document at all, but which indicate user activity, such as mouse movements.

Session data may include information about the document that was open when the human-computer interaction occurred, such as the document name, document ID, document length, number and size/length/amount of different document elements (e.g. text, tables, images, etc.), and the like. Session data may also include application information, such as the application name, locale information (e.g. LCID), whether the application was in a view mode or an edit mode, where geographically the application was executing, which platform (e.g. operating system) the application was executing on, etc. Session data may also include information about the session itself, such as session start and end time, what triggered the session to begin or end (e.g. a document open event started the session, and a timeout or document close ended the session) etc.

Session data may be captured from a multitude of users as they interact with an application over time. This provides data from a diverse cohort of users, increasing the accuracy of reading time estimates.

Control then passes to operation 504, where reading sessions are identified in part by excluding sessions that are explicitly not reading sessions. In some embodiments, the existence of one or more particular behavior signals explicitly define a session as a non-reading session. For example, behavior signals that edit a document, such as keystrokes that add content to a document, indicate that a session is an editing session and should be excluded from further consideration as a reading session. Similarly, behavior signals that print the document or re-format the document cause the session to be excluded from consideration as a reading session.

In other embodiments, sessions with small numbers of non-reading behavior signals (e.g. below a defined number of behavior signals per unit of time) are still considered reading sessions, particularly when the behavior signals are of a particular type and occur at a particular time in the session. For example, a command to put the application into reading mode, or keystrokes that add a signature to the end of a document may be allowed in sessions that would otherwise be excluded.

Control then passes to operation 506, where clusters of the non-excluded sessions are generated. In some embodiments, clusters are generated based on a shared attribute, e.g. a cluster may be generated to include sessions having the same document ID. However, clusters may be generated based on multiple shared attributes, e.g. (1) whether the document includes a table and (2) the language of the document. Clusters may be generated based on any value of an attribute, e.g. the values listed in FIGS. 4B and 4C. Moreover, clusters may be generated for any value of any attribute, e.g. any keystroke, any command, or any other user behavior signal.

Clusters may be defined as sessions having a particular value of the attribute in common (e.g. the same document ID). However, clusters may also be defined as sessions having one of a plurality of values of the attribute, or a value within a range of values of the attribute.

Control then passes to operation 508, where for each cluster, a regression line is fit to the mapping between session length and the value of the shared attribute. In some embodiments, the regression comprises a linear regression. However, other relationships are similarly contemplated, including regression lines that are logarithmic, polynomic, a succession of linear regressions with different slopes, etc.

If a regression line can be fit such that the average distance from each data point (e.g. session length on the y-axis and the value of the shared attribute on the x-axis) is less than a defined amount, then it is determined that a relationship exists between session length and the shared attribute. In some embodiments this distance is calculated by finding a line perpendicular to the regression line that intersects the data point. In some embodiments, when clusters are selected based on two or more attribute values, the regression line may be defined in three or more dimensions.

Control then passes to operation 510, where if a relationship was determined to exist in operation 508, then outlier sessions are excluded from the session data. For example, sessions may be excluded as outliers if the distance from the {session length, shared attribute value} data point to the regression line is greater than a defined threshold. In other embodiments, a defined percentage of sessions may be excluded, e.g. 20% of sessions furthest from the regression line may be excluded.

Control then passes to operation 512, where, optionally, clusters are themselves ranked. In some embodiments, clusters are ranked based on an average distance of each session from the regression line. This average distance measures how well the cluster can be fit to the regression line—a lower average distance means the regression line is a better fit for the cluster. This ranking may be performed before or after outlier sessions are removed from consideration.

Then, sessions included in clusters ranked below a defined threshold may be removed from further consideration as a reading session. Sessions may be excluded from further consideration even if they are included in another cluster, and would have been included based on their inclusion in the other cluster. In this way, sessions that are included in clusters that make better predictions about estimated reading time are preferred at to sessions included in clusters that make worse predictions about reading time.

Control then passes to operation 514, where an algorithm is generated to estimate reading time in an unseen document. In some embodiments, the algorithm includes one or more terms, each term representing an estimated reading time for a type of content (e.g. text, image, table, etc.). Each term may be represented by an amount of a particular content type multiplied by a coefficient. In some embodiments, generating the algorithm includes determining the coefficients for each content type.

In some embodiments, the algorithm sums the values of each term, based on the intuition that each element type contributes linearly to the overall estimated reading time. For example, an algorithm may be generated that defines estimated reading time as "a*x+b*y", where x is the amount of text in a document (e.g. the number of words), y is the number of images, and a and b are coefficients derived from the historical session data. However, this is but one example. Additional terms may be added, e.g. a "c*z" term, where z is the number of tables included in the document. In some embodiments, coefficients are equal to, or derived from, the slope of the regression line.

In some embodiments, the coefficient of each term is the inverse of the slope of the regression line. For example, if the slope of the regression relating session length and number of images has a slope of 2.5, a=1/2.5. Equivalently, the equation may be defined without inverting the coefficients as "x/a+y/b", i.e. by simply dividing by the coefficients.

Also, terms may be further manipulated based on the element type (in addition to the coefficient). For example, time to read may be defined as "log(WC)/WPM+IC^2/IPM" (the logarithm of word count (WC) divided by words per minute read (WPM) plus image count (IC) squared divided by images per minute read (IPM). This may be done, for example, if research shows that word count is more often approximated with a logarithmic regression.

In some embodiments, coefficients are derived iteratively by subtracting out estimated reading times of previously estimated element types. For example, in order to estimate a contribution of images to estimated reading time, documents containing text may be first analyzed to determine a coefficient usable to estimate reading time contributed by text. Then, documents containing previously analyzed element types (e.g. text) and the additional element type (e.g.

images) may be analyzed, but the contribution to estimated reading time due to text is subtracted out, leaving the contribution to estimated reading time due to images. For example, an amount of text found in a document containing text and images may be multiplied by the coefficient previously derived for the contribution of text to estimated reading time. The resulting value may be subtracted from the session length, such that the remaining session length is attributable to reading images in the document.

This process may be expanded as additional content types are analyzed. Continuing the example, determining the value of a coefficient for estimating the contribution of tables may be derived by analyzing documents that contain text and images, and subtracting out their contributions from reading session length of documents that have text, images, and tables.

Control then passes to operation 516, where the algorithm is applied to an unseen document to generate an estimated reading time. In some embodiments, the unseen document is analyzed to determine a count of different element types, e.g. the number of words, number of images, number of tables, etc. These counts may then be substituted into the generated algorithm to generate the estimated reading time. The process 500 then comes to an end.

Figure 6:
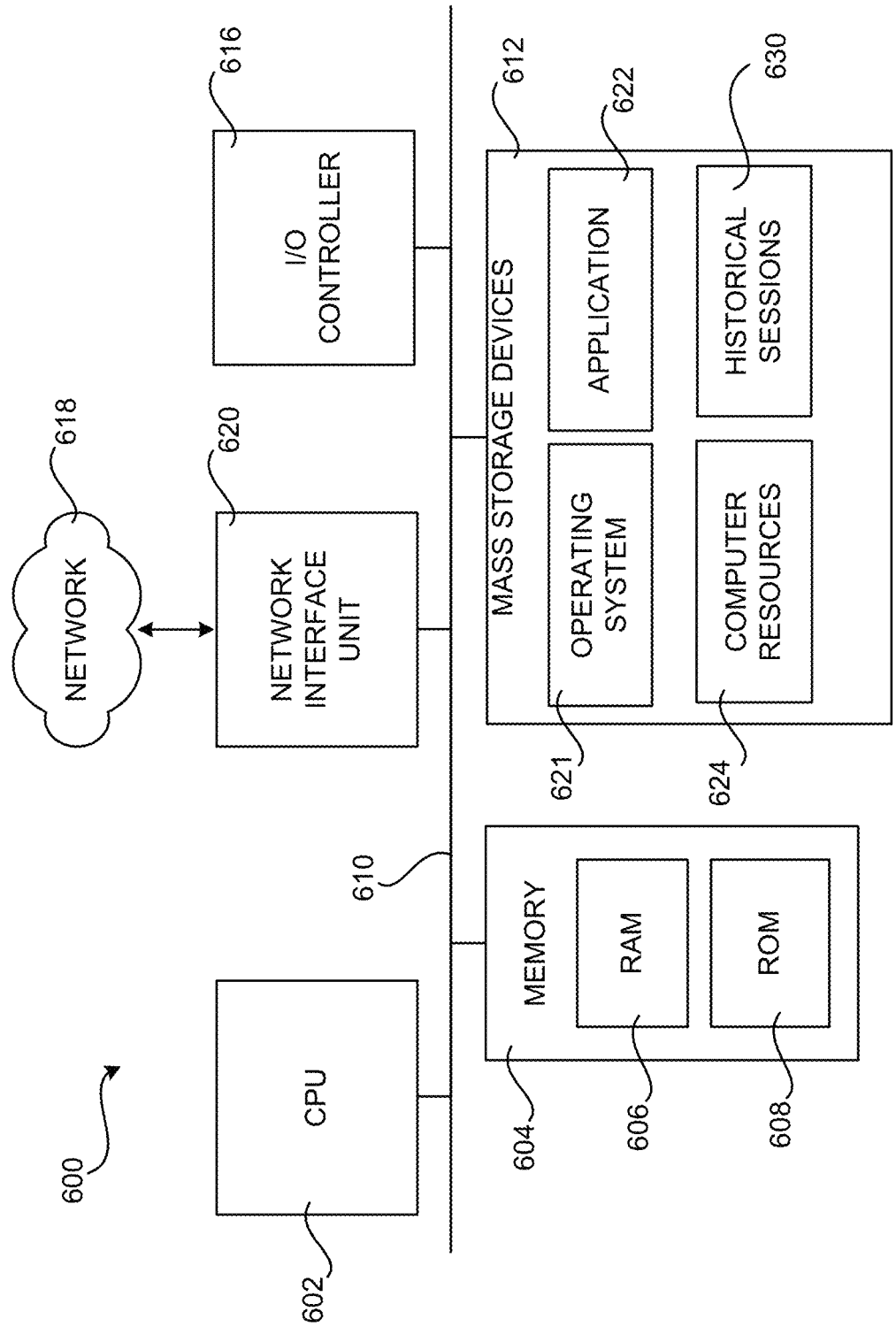
FIG. 6 is a computer architecture diagram showing an illustrative computer hardware and software architecture for a computing device, such as the computing devices shown in FIGS. 1-4, that can implement aspects of the technologies presented herein.

FIG. 6 is a computer architecture diagram that shows an architecture for a computer 600 capable of executing the software components described herein. The architecture illustrated in FIG. 6 is an architecture for a server computer, mobile phone, an e-reader, a smartphone, a desktop computer, a netbook computer, a tablet computer, a laptop computer, or another type of computing device suitable for executing the software components presented herein.

In this regard, it should be appreciated that the computer 600 shown in FIG. 6 can be utilized to implement a computing device capable of executing any of the software components presented herein. For example, and without limitation, the computing architecture described with reference to FIG. 6 can be utilized to implement computing device 100, which is capable of executing the various software components described above, such as the operations of the processes illustrated in FIG. 5.

The computer 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, is stored in the ROM 608. The computer 600 further includes one or more mass storage devices 612 for storing an operating system 621, application programs 622, and other types of programs and data including, but not limited to, the computer resources 624 and historical sessions 630. The computer resources 624 and historical sessions 630 can be stored in a different storage device from one another.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer executable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 618. The computer 600 can connect to the network 618 through a network interface unit 620 connected to the bus 610. It should be appreciated that the network interface unit 620 can also be utilized to connect to other types of networks and remote computer systems. The computer 600 can also include an input/output controller 616 for receiving and processing input from a number of other devices, including a keyboard, mouse, touch input, or electronic stylus (not shown in FIG. 6). Similarly, the input/output controller 616 can provide output to a display screen or other type of output device (also not shown in FIG. 6).

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones and tablets, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
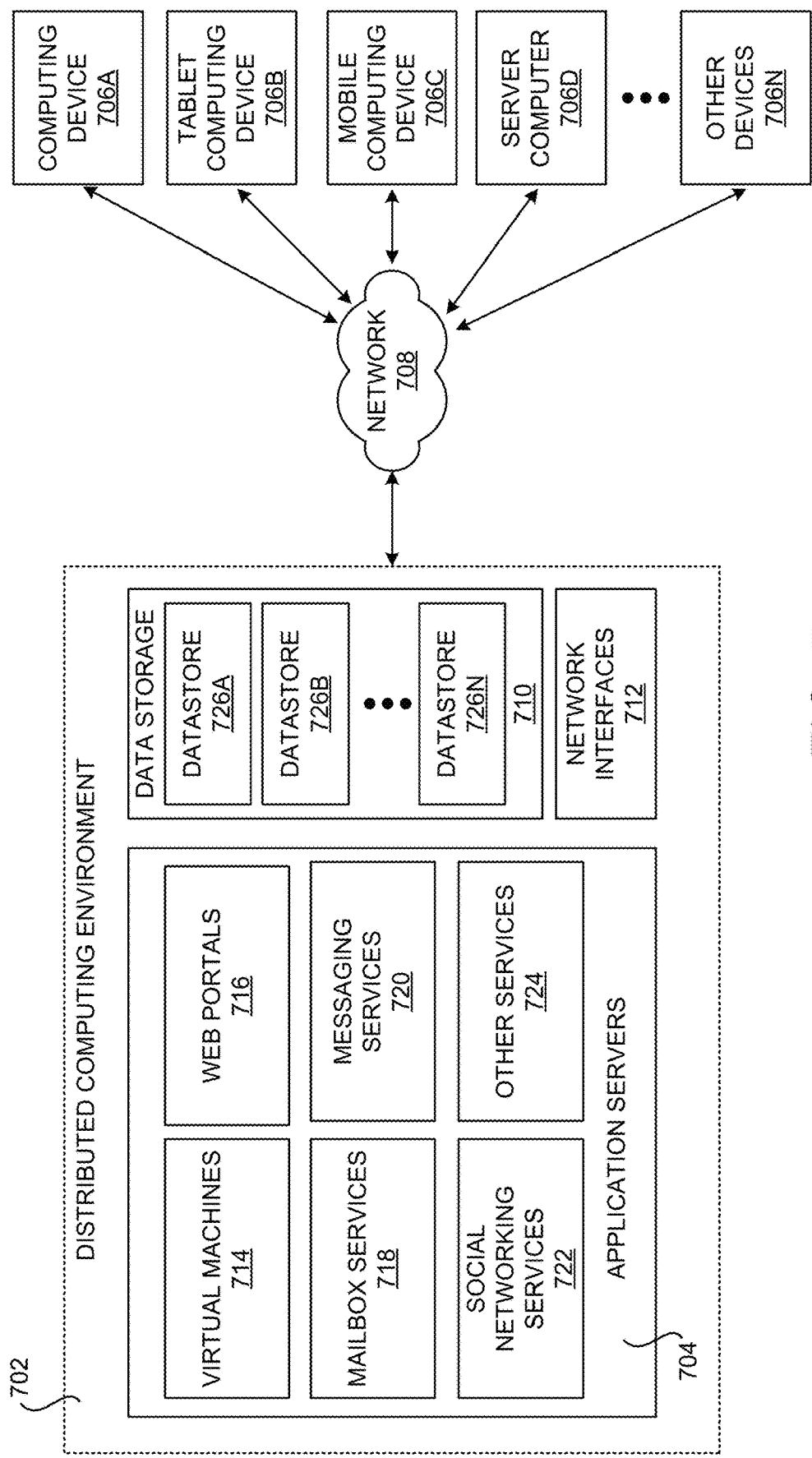
FIG. 7 is a network diagram illustrating a distributed computing environment capable of implementing aspects of the technologies presented herein.

FIG. 7 shows aspects of an illustrative distributed computing environment 702 that can provide cloud sourced resources, such as the resources for s system for estimating document reading time based on apparent user activity, in which the software components described herein can be executed. Thus, the distributed computing environment 702 illustrated in FIG. 7 can be used to execute program code capable of providing the functionality described above with respect to FIGS. 1-5 and/or any of the other software components described herein.

According to various implementations, the distributed computing environment 702 operates on, in communication with, or as part of a network 708. One or more client devices 706A-706N (hereinafter referred to collectively and/or generically as "devices 706") can communicate with the distributed computing environment 702 via the network 708 and/or other connections (not illustrated in FIG. 7).

In the illustrated configuration, the devices 706 include: a computing device 706A such as a laptop computer, a desktop computer, or other computing device; a "slate" or tablet computing device ("tablet computing device") 706B; a mobile computing device 706C such as a mobile telephone, a smartphone, or other mobile computing device; a server computer 706D; and/or other devices 706N. It should be understood that any number of devices 706 can communicate with the distributed computing environment 702. Two example computing architectures for the devices 706 are illustrated and described herein with reference to FIGS. 6 and 8. It should be understood that the illustrated client devices 706 and computing architectures illustrated and described herein are illustrative and should not be construed as being limited in any way.

In the illustrated configuration, the distributed computing environment 702 includes application servers 704, data storage 710, and one or more network interfaces 712. According to various implementations, the functionality of the application servers 704 can be provided by one or more server computers that are executing as part of, or in communication with, the network 708. The application servers 704 can host various services such as virtual machines, portals, and/or other resources. In the illustrated configuration, the application servers 704 host one or more virtual machines 714 for hosting applications, such as program components for implementing the functionality described above with regard to FIGS. 1-5. It should be understood that this configuration is illustrative and should not be construed as being limiting in any way. The application servers 704 might also host or provide access to one or more web portals, link pages, websites, and/or other information ("web portals") 716.

According to various implementations, the application servers 704 also include one or more mailbox services 718 and one or more messaging services 720. The mailbox services 718 can include electronic mail ("email") services. The mailbox services 718 can also include various personal information management ("PIM") services including, but not limited to, calendar services, contact management services, collaboration services, and/or other services. The messaging services 720 can include, but are not limited to, instant messaging ("IM") services, chat services, forum services, and/or other communication services.

The application servers 704 can also include one or more social networking services 722. The social networking services 722 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 722 are provided by or include the FACEBOOK social networking service, the LINKEDIN professional networking service, the FOURSQUARE geographic networking service, and the like. In other configurations, the social networking services 722 are provided by other services, sites, and/or providers that might be referred to as "social networking providers." For example, some websites allow users to interact with one another via email, chat services, and/or other means during various activities and/or contexts such as reading published articles, commenting on goods or services, publishing, collaboration, gaming, and the like. Other services are possible and are contemplated.

The social network services 722 can include commenting, blogging, and/or microblogging services. Examples of such services include, but are not limited to, the YELP commenting service, the KUDZU review service, the OFFICETALK enterprise microblogging service, the TWITTER messaging service, and/or other services. It should be appreciated that the above lists of services are not exhaustive and that numerous additional and/or alternative social networking services 722 are not mentioned herein for the sake of brevity. As such, the configurations described above are illustrative, and should not be construed as being limited in any way.

As also shown in FIG. 7, the application servers 704 can also host other services, applications, portals, and/or other resources ("other services") 724. These services can include, but are not limited to, streaming video services like the NETFLIX streaming video service and productivity services such as the GMAIL email service from GOOGLE INC. It thus can be appreciated that activities performed by users of the distributed computing environment 702 can include various mailbox, messaging, social networking, group conversation, productivity, entertainment, and other types of activities. Use of these services, and others, can be detected and used to customize the operation of a computing device utilizing the technologies disclosed herein.

As mentioned above, the distributed computing environment 702 can include data storage 710. According to various implementations, the functionality of the data storage 710 is provided by one or more databases operating on, or in communication with, the network 708. The functionality of the data storage 710 can also be provided by one or more server computers configured to host data for the distributed computing environment 702. The data storage 710 can include, host, or provide one or more real or virtual datastores 726A-726N (hereinafter referred to collectively and/or generically as "datastores 726"). The datastores 726 are configured to host data used or created by the application servers 704 and/or other data.

The distributed computing environment 702 can communicate with, or be accessed by, the network interfaces 712. The network interfaces 712 can include various types of network hardware and software for supporting communications between two or more computing devices including, but not limited to, the devices 706 and the application servers 704. It should be appreciated that the network interfaces 712 can also be utilized to connect to other types of networks and/or computer systems.

It should be understood that the distributed computing environment 702 described herein can implement any aspects of the software elements described herein with any number of virtual computing resources and/or other distributed computing functionality that can be configured to execute any aspects of the software components disclosed herein. It should also be understood that the devices 706 can also include real or virtual machines including, but not limited to, server computers, web servers, personal computers, gaming consoles or other types of gaming devices, mobile computing devices, smartphones, and/or other devices. As such, various implementations of the technologies disclosed herein enable any device configured to access the distributed computing environment 702 to utilize the functionality described herein.

Figure 8:
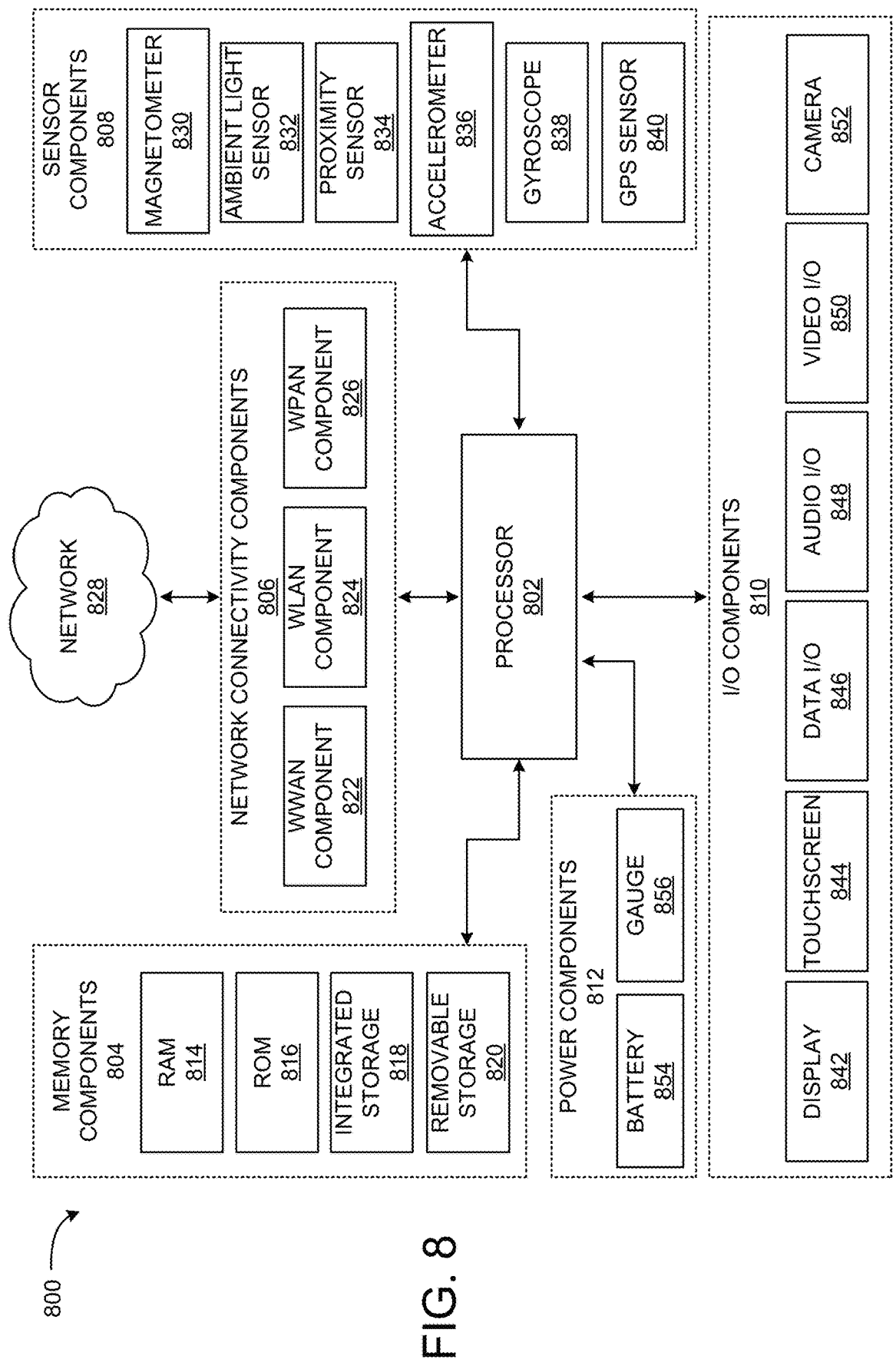
FIG. 8 is a computer architecture diagram illustrating a computing device architecture for a computing device, such as the computing devices shown in FIGS. 1-4, that is capable of implementing aspects of the technologies presented herein.

Turning now to FIG. 8, an illustrative computing device architecture 800 will be described for a computing device, such as the computing device 100 illustrated in FIG. 1 that is capable of executing the various software components described herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 800 is also applicable to any of the devices 706 shown in FIG. 7. Furthermore, aspects of the computing device architecture 800 are applicable to traditional desktop computers, portable computers (e.g., laptops, notebooks, ultra-portables, and netbooks), server computers, and other computer devices, such as those described herein. For example, the single touch and multi-touch aspects disclosed herein below can be applied to desktop, laptop, convertible, smartphone, or tablet computer devices that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 8, the components can be connected electrically in order to interact and carry out device functions. In some configurations, the components are arranged so as to communicate via one or more busses (not shown).

The processor 802 includes one or more CPU cores configured to process data, execute computer executable instructions of one or more application programs and to communicate with other components of the computing device architecture 800 in order to perform various functionality described herein. The processor 802 can be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and engineering computing applications, as well as graphics-intensive computing applications such as high-resolution video (e.g., 720P, 1080P, 4K, and greater), video games, 3D modeling applications, and the like. In some configurations, the processor 802 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 802 is, or is included in, a system-on-chip ("SoC") along with one or more of the other components described herein below. For example, the SoC can include the processor 802, a GPU, one or more of the network connectivity components 806, and one or more of the sensor components 808. In some configurations, the processor 802 is fabricated, in part, utilizing a package-on-package ("PoP") integrated circuit packaging technique. Moreover, the processor 802 can be a single core or multi-core processor.

The processor 802 can be created in accordance with an ARM architecture, available for license from ARM HOLDINGS of Cambridge, United Kingdom. Alternatively, the processor 802 can be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a RAM 814, a ROM 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 or the removable storage 820.

The integrated storage 818 can include a solid-state memory, a hard disk, or a combination of solid-state memory and a hard disk. The integrated storage 818 can be soldered or otherwise connected to a logic board upon which the processor 802 and other components described herein might also be connected. As such, the integrated storage 818 is integrated in the computing device. The integrated storage 818 can be configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to, the WINDOWS operating system from MICROSOFT CORPORATION, the IOS operating system from APPLE INC. of Cupertino, Calif., and ANDROID operating system from GOOGLE INC. of Mountain View, Calif. Other operating systems can also be utilized.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 828, which can be a WWAN, a WLAN, or a WPAN. Although a single network 828 is illustrated, the network connectivity components 806 can facilitate simultaneous communication with multiple networks. For example, the network connectivity components 806 can facilitate simultaneous communications with multiple networks via one or more of a WWAN, a WLAN, or a WPAN.

The network 828 can be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 828 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 828 can be configured to provide voice and/or data communications with any combination of the above technologies. The network 828 can be configured or adapted to provide voice and/or data communications in accordance with future generation technologies.

In some configurations, the WWAN component 822 is configured to provide dual-multi-mode connectivity to the network 828. For example, the WWAN component 822 can be configured to provide connectivity to the network 828, wherein the network 828 provides service via GSM and UMTS technologies, or via some other combination of technologies. Alternatively, multiple WWAN components 822 can be utilized to perform such functionality, and/or provide additional functionality to support other non-compatible technologies (i.e., incapable of being supported by a single WWAN component). The WWAN component 822 can facilitate similar connectivity to multiple networks (e.g., a UMTS network and an LTE network).

The network 828 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 828 via the WI-FI access points. Such connections can be secured via various encryption technologies including, but not limited, WI-FI Protected Access ("WPA"), WPA2, Wired Equivalent Privacy ("WEP"), and the like.

The network 828 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 830, an ambient light sensor 832, a proximity sensor 834, an accelerometer 836, a gyroscope 838, and a Global Positioning System sensor ("GPS sensor") 840. It is contemplated that other sensors, such as, but not limited to, temperature sensors or shock detection sensors, might also be incorporated in the computing device architecture 800.

The magnetometer 830 is configured to measure the strength and direction of a magnetic field. In some configurations, the magnetometer 830 provides measurements to a compass application program stored within one of the memory components 804 in order to provide a user with accurate directions in a frame of reference including the cardinal directions, north, south, east, and west. Similar measurements can be provided to a navigation application program that includes a compass component. Other uses of measurements obtained by the magnetometer 830 are contemplated.

The ambient light sensor 832 is configured to measure ambient light. In some configurations, the ambient light sensor 832 provides measurements to an application program stored within one the memory components 804 in order to automatically adjust the brightness of a display (described below) to compensate for low light and bright light environments. Other uses of measurements obtained by the ambient light sensor 832 are contemplated.

The proximity sensor 834 is configured to detect the presence of an object or thing in proximity to the computing device without direct contact. In some configurations, the proximity sensor 834 detects the presence of a user's body (e.g., the user's face) and provides this information to an application program stored within one of the memory components 804 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 834 are contemplated.

The accelerometer 836 is configured to measure proper acceleration. In some configurations, output from the accelerometer 836 is used by an application program as an input mechanism to control some functionality of the application program. In some configurations, output from the accelerometer 836 is provided to an application program for use in switching between landscape and portrait modes, calculating coordinate acceleration, or detecting a fall. Other uses of the accelerometer 836 are contemplated.

The gyroscope 838 is configured to measure and maintain orientation. In some configurations, output from the gyroscope 838 is used by an application program as an input mechanism to control some functionality of the application program. For example, the gyroscope 838 can be used for accurate recognition of movement within a 3D environment of a video game application or some other application. In some configurations, an application program utilizes output from the gyroscope 838 and the accelerometer 836 to enhance user input operations. Other uses of the gyroscope 838 are contemplated.

The GPS sensor 840 is configured to receive signals from GPS satellites for use in calculating a location. The location calculated by the GPS sensor 840 can be used by any application program that requires or benefits from location information. For example, the location calculated by the GPS sensor 840 can be used with a navigation application program to provide directions from the location to a destination or directions from the destination to the location. Moreover, the GPS sensor 840 can be used to provide location information to an external location-based service, such as E911 service. The GPS sensor 840 can obtain location information generated via WI-FI, WIMAX, and/or cellular triangulation techniques utilizing one or more of the network connectivity components 806 to aid the GPS sensor 840 in obtaining a location fix. The GPS sensor 840 can also be used in Assisted GPS ("A-GPS") systems.

The I/O components 810 include a display 842, a touchscreen 844, a data I/O interface component ("data I/O") 846, an audio I/O interface component ("audio I/O") 848, a video I/O interface component ("video I/O") 850, and a camera 852. In some configurations, the display 842 and the touchscreen 844 are combined. In some configurations two or more of the data I/O component 846, the audio I/O component 848, and the video I/O component 850 are combined. The I/O components 810 can include discrete processors configured to support the various interfaces described below or might include processing functionality built-in to the processor 802.

The display 842 is an output device configured to present information in a visual form. In particular, the display 842 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 842 is a liquid crystal display ("LCD") utilizing any active or passive matrix technology and any backlighting technology (if used). In some configurations, the display 842 is an organic light emitting diode ("OLED") display. Other display types are contemplated.

The touchscreen 844 is an input device configured to detect the presence and location of a touch. The touchscreen 844 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 844 is incorporated on top of the display 842 as a transparent layer to enable a user to use one or more touches to interact with objects or other information presented on the display 842. In other configurations, the touchscreen 844 is a touch pad incorporated on a surface of the computing device that does not include the display 842. For example, the computing device can have a touchscreen incorporated on top of the display 842 and a touch pad on a surface opposite the display 842.

In some configurations, the touchscreen 844 is a single-touch touchscreen. In other configurations, the touchscreen 844 is a multi-touch touchscreen. In some configurations, the touchscreen 844 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 844. As such, a developer can create gestures that are specific to a particular application program.

In some configurations, the touchscreen 844 supports a tap gesture in which a user taps the touchscreen 844 once on an item presented on the display 842. The tap gesture can be used for various reasons including, but not limited to, opening or launching whatever the user taps, such as a graphical icon. In some configurations, the touchscreen 844 supports a double tap gesture in which a user taps the touchscreen 844 twice on an item presented on the display 842. The double tap gesture can be used for various reasons including, but not limited to, zooming in or zooming out in stages. In some configurations, the touchscreen 844 supports a tap and hold gesture in which a user taps the touchscreen 844 and maintains contact for at least a pre-defined time. The tap and hold gesture can be used for various reasons including, but not limited to, opening a context-specific menu.

In some configurations, the touchscreen 844 supports a pan gesture in which a user places a finger on the touchscreen 844 and maintains contact with the touchscreen 844 while moving the finger on the touchscreen 844. The pan gesture can be used for various reasons including, but not limited to, moving through screens, images, or menus at a controlled rate. Multiple finger pan gestures are also contemplated. In some configurations, the touchscreen 844 supports a flick gesture in which a user swipes a finger in the direction the user wants the screen to move. The flick gesture can be used for various reasons including, but not limited to, scrolling horizontally or vertically through menus or pages. In some configurations, the touchscreen 844 supports a pinch and stretch gesture in which a user makes a pinching motion with two fingers (e.g., thumb and forefinger) on the touchscreen 844 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 844. As such, the above gestures should be understood as being illustrative and should not be construed as being limiting in any way.

The data I/O interface component 846 is configured to facilitate input of data to the computing device and output of data from the computing device. In some configurations, the data I/O interface component 846 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 848 is configured to provide audio input and/or output capabilities to the computing device. In some configurations, the audio I/O interface component 848 includes a microphone configured to collect audio signals. In some configurations, the audio I/O interface component 848 includes a headphone jack configured to provide connectivity for headphones or other external speakers. In some configurations, the audio interface component 848 includes a speaker for the output of audio signals. In some configurations, the audio I/O interface component 848 includes an optical audio cable out.

The video I/O interface component 850 is configured to provide video input and/or output capabilities to the computing device. In some configurations, the video I/O interface component 850 includes a video connector configured to receive video as input from another device (e.g., a video media player such as a DVD or BLU-RAY player) or send video as output to another device (e.g., a monitor, a television, or some other external display). In some configurations, the video I/O interface component 850 includes a High-Definition Multimedia Interface ("HDMI"), mini-HDMI, micro-HDMI, DisplayPort, or proprietary connector to input/output video content. In some configurations, the video I/O interface component 850 or portions thereof is combined with the audio I/O interface component 848 or portions thereof.

The camera 852 can be configured to capture still images and/or video. The camera 852 can utilize a charge coupled device ("CCD") or a complementary metal oxide semiconductor ("CMOS") image sensor to capture images. In some configurations, the camera 852 includes a flash to aid in taking pictures in low-light environments. Settings for the camera 852 can be implemented as hardware or software buttons.

Although not illustrated, one or more hardware buttons can also be included in the computing device architecture 800. The hardware buttons can be used for controlling some operational aspect of the computing device. The hardware buttons can be dedicated buttons or multi-use buttons. The hardware buttons can be mechanical or sensor-based.

The illustrated power components 812 include one or more batteries 854, which can be connected to a battery gauge 856. The batteries 854 can be rechargeable or disposable. Rechargeable battery types include, but are not limited to, lithium polymer, lithium ion, nickel cadmium, and nickel metal hydride. Each of the batteries 854 can be made of one or more cells.

The battery gauge 856 can be configured to measure battery parameters such as current, voltage, and temperature. In some configurations, the battery gauge 856 is configured to measure the effect of a battery's discharge rate, temperature, age and other factors to predict remaining life within a certain percentage of error. In some configurations, the battery gauge 856 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 812 can also include a power connector (not shown), which can be combined with one or more of the aforementioned I/O components 810. The power components 812 can interface with an external power system or charging equipment via a power I/O component 810. Other configurations can also be utilized.

The disclosure presented herein also encompasses the subject matter set forth in the following clauses:

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for estimating document reading time, the method comprising:
   receiving user action data captured from non-scrolling user actions performed during a plurality of sessions of a user interacting with an application, wherein non-scrolling user actions modify an individual document, comment on an individual document, or cause an individual document to be printed;
   identifying reading sessions from the plurality of sessions by, based on the user action data:
      excluding sessions that include a non-scrolling user action from the plurality of sessions to produce a remaining plurality of sessions;
      identifying, from the remaining plurality of sessions, a cluster of sessions that have a shared attribute;
      determining for sessions within the cluster of sessions if a relationship exists between session lengths and values of the shared attribute; and
      excluding sessions from the remaining plurality of sessions that have a session length and a value of the shared attribute value that does not fall within a defined distance of a regression line defining the relationship;
   defining an algorithm that estimates document reading time based on the identified reading sessions; and
   applying the algorithm to a document to estimate reading time.

2. The method of claim 1, wherein each cluster comprises sessions that have a particular value of a session attribute, sessions that have one of a plurality of particular values of a session attribute, or sessions that have one of a range of values of a session attribute.

3. The method of claim 1, wherein the non-scrolling user action indicates that a content of the document was altered.

4. The method of claim 1, wherein the relationship includes in part a logarithmic relationship that estimates less time per page to read a page as the number of pages increases or a polynomial relationship that estimates more time to read a page as the number of pages increases.

5. The method of claim 1, wherein each cluster includes sessions selected based on another shared attribute in addition to the shared attribute, and wherein the relationship is determined in three dimensions with respect to session length, the shared attribute, and the other shared attribute.

6. The method of claim 1, wherein a session begins when a document is opened by the application and ends when the document is closed by the application.

7. The method of claim 1, wherein the received user action data is also captured from scrolling user actions that change what portion of an individual document is visible.

8. The method of claim 1, wherein a session begins when an individual document is opened and ends when an individual document is closed.

9. A computing device comprising:
   at least one processor; and
   at least one memory in communication with the at least one processor, the at least one memory having stored thereon computer readable instructions that, when executed by the computing device, cause the computing device to at least:
   receive user action data captured from non-scrolling user actions performed during a plurality of sessions of a user interacting with an application, wherein non-scrolling user actions modify an individual document, comment on an individual document, or cause an individual document to be printed;
   identify reading sessions from the plurality of sessions by, based on the user action data:
      excluding sessions that include a non-scrolling user action from the plurality of sessions to produce a remaining plurality of sessions;
      identifying, from the remaining plurality of sessions, a cluster of sessions that have a shared attribute;
      determining for sessions within the cluster of sessions if a relationship exists between session lengths and values of the shared attribute;
      excluding sessions from the remaining plurality of sessions that have a session length and a value of the shared attribute value that does not fall within a defined distance of a regression line defining the relationship;
      ranking clusters having the same shared attribute based on average distance to the regression line; and
      excluding sessions from the remaining plurality of sessions that appear in clusters ranked below a defined threshold ranking;
   defining an algorithm that estimates document reading time based on the identified reading sessions; and
   applying the algorithm to a document to estimate a reading time.

10. The computing device of claim 9, further including:
    giving greater weight when generating the algorithm to sessions that appear in clusters that rank above a second defined threshold.

11. The computing device of claim 10, wherein a session may be included in a plurality of clusters.

12. The computing device of claim 11, wherein the algorithm is defined by determining a coefficient by which to multiply a number of words in the document.

13. The computing device of claim 12, wherein the document includes a plurality of types of content, and wherein the algorithm is defined by determining a coefficient for each of the types of content.

14. The computing device of claim 13, wherein each term of the algorithm is added together to determine the estimated reading time.

15. A computer implemented method for estimating document reading time, the method comprising:
    receiving user action data captured from non-scrolling user actions performed during a plurality of sessions of a user interacting with an application, wherein non-scrolling user actions modify an individual document, comment on an individual document, or cause an individual document to be printed;
    excluding sessions that include a non-scrolling user action from the plurality of sessions to produce a remaining plurality of sessions;
    identifying, from the remaining plurality of sessions, a cluster of sessions that have a shared attribute;
    determining for sessions within the cluster of sessions if a relationship exists between session lengths and values of the shared attribute; and
    excluding sessions from the remaining plurality of sessions that have a session length and a value of the shared attribute value that does not fall within a defined distance of a regression line defining the relationship, the excluding identifying reading sessions;
    defining an algorithm that estimates document reading time based on the identified reading sessions, wherein a document has a plurality of content types, and wherein the generated algorithm includes at least one term for each content type; and applying the algorithm to the document to estimate a reading time.

16. The method of claim 15, wherein defining the algorithm includes determining a coefficient for each term, and wherein applying the algorithm includes, for each content type in the document, counting a number of instances of that content type and multiplying by the corresponding determined coefficient.

17. The method of claim 15, wherein each term of the generated algorithm calculates an estimated amount of time to read a corresponding type of content.

18. The method of claim 17, wherein a total estimated amount of time to read the document is calculated by summing the amount of time estimated for each type of content contained in the unseen document.

19. The method of claim 17, wherein a coefficient is determined for the text content type by analyzing sessions from documents that only include text, and wherein an additional coefficient associated with a different content type is determined by analyzing sessions from documents that include text and the different content type, and by subtracting out the estimated contribution of the text content type.

20. The method of claim 19, wherein a third coefficient associated with a third content type is determined by analyzing sessions from documents that include text, the different content type, and the third content type, and by subtracting out the estimated contribution of the text content type and the different content type.

* * * * *